May 15, 1951 E. W. WORK 2,553,347
AUTOMATIC PRESSURE, TEMPERATURE, AND VACUUM RELIEF VALVE
Filed Dec. 6, 1947
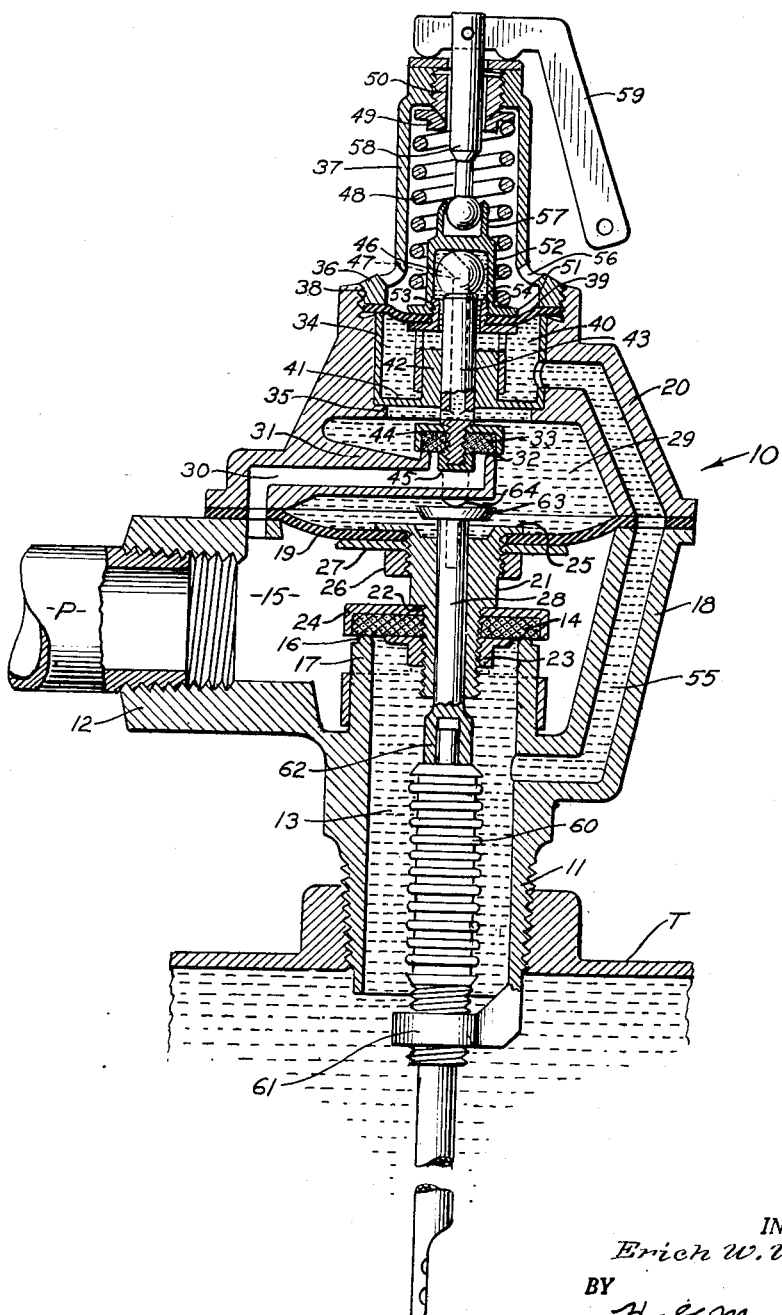
INVENTOR.
Erich W. Work
BY
H. G. Manning
Attorney Patented May 15, 1951

2,553,347

UNITED STATES PATENT OFFICE 2,553,347

AUTOMATIC PRESSURE, TEMPERATURE, AND VACUUM RELIEF VALVE

Erich W. Work, West Hartford, Conn., assignor to The Beaton & Cadwell Mfg. Co., New Britain, Conn., a corporation of Connecticut Application December 6, 1947, Serial No. 790,205

6 Claims. (Cl. 236—80)

This invention relates to automatic relief valves, and more particularly to a valve responsive to excess positive or negative fluid pressure or excess temperature to release fluid from a tank or other vessel.

The improved valve is designed to prevent explosions in connection with domestic hot water supply systems, industrial pressure systems, and other systems containing liquids and gases which may attain either excessive pressure or excessive temperature, or both. The valve will also relieve a vacuum, whereby collapsing of the tank or vessel will be prevented.

One object of this invention is to provide an automatic relief valve having a main valve and an auxiliary discharge valve controlling said main valve in such a manner that a high discharge capacity is obtained without advancing the predetermined point of relief, and also causing the main valve to close before an excessive pressure drop occurs.

Another object is to provide a device of the above nature which will operate equally well to relieve excessive pressure or excessive temperature of either liquids or gases, or to relieve a vacuum in a system that is normally under pressure.

Another object is to provide a device of the above nature having an auxiliary discharge valve actuated by independently adjustable pressure responsive and heat responsive means.

Another object is to provide a device of the above nature having a main valve directly actuated by fluid pressures alone, said valve having no direct connection with springs, weights, or mechanical lever mechanisms.

A further object is to provide a device of the above nature which will be simple in construction, inexpensive to manufacture, easy to install and manipulate, compact, and very efficient and durable in use.

With these and other objects in view, there has been illustrated on the accompanying drawing one form in which the invention may conveniently be embodied in practice.

The drawing shows a sectional view taken on the vertical axis of the improved pressure, temperature, and vacuum relief valve.

Referring now to the drawing, the numeral 10 indicates generally a valve housing having a lower end in the form of a threaded nipple 11 adapted for connection to a tank or other pressure vessel T. The housing 10 is provided with a tapped drain outlet 12 at one side for connection to the discharge pipe P which may lead to any point suitable for discharge of the excess fluid passing through the relief valve.

When the fluid is being discharged from the tank T, the principal path of the flow will be upwardly through the threaded nipple 11 and a vertical channel 13 past a main valve disk 14, which will then be wide open, and through a main chamber 15 into the pipe P. The main valve disk 14 normally closes a circular main valve seat 16 on the upper edge of a cylindrical flange 17 formed on the interior of the housing 10, said valve disk 14 being actuated by mechanisms which will be described hereinafter. The main chamber 15 is formed as a cavity in the upper end of a lower housing section 18 closed at the top by a flexible main diaphragm 19 clamped between the housing section 18 and an upper housing section 20, as by screws (not shown).

The main valve disk 14 is connected in parallel concentric relation to the main diaphragm 19 by a tubular main valve stem 21 having a downwardly facing shoulder 22, and a retaining nut 23 threaded thereon to hold the main valve disk 14 in a backing cup 24 against said shoulder 22. The main valve stem 21 is provided with a circular flange 25 at its upper end and passes downwardly through a central aperture of the main diaphragm 19, said stem having a nut 26 threaded thereon, which bears against a washer 27 to clamp the central portion of the main diaphragm 19 against the underface of the circular flange 25, whereby the main valve disk 14 and main diaphragm 19 will be securely held for simultaneous movement.

Slidably fitted within the tubular stem 21 is a vertical push rod 28 forming part of a temperature responsive mechanism for opening the relief valve, to be described below.

The flexible main diaphragm 19 serves as the lower wall of a pressure chamber 29 formed in the lower part of the upper housing section 20. The housing 10 is provided with an angular outlet channel 30 extending from a central point in the pressure chamber 29, through a radial arm 31 formed integrally with the upper housing section 20 and into the main chamber 15, said arm being formed at its inner end with an upwardly facing circular discharge valve seat 32 centrally of the pressure chamber 29, said valve seat normally being closed by a discharge valve disk 33.

A cylindrical cup 34 is snugly fitted into a bore in the upper end of the housing 10, and is retained between an inner shoulder 35 formed at the top of the pressure chamber 29, and the lower end 36 of a tubular spring housing 37 threaded into a counterbore 38 in the upper housing section 20.

The cylindrical cup 34 is provided with an upper movable wall in the form of an upper flexible diaphragm 39 clamped between said cup 34 and said spring housing 37, thereby forming an upper chamber 40. The bottom 41 of the cup 34 serves as a division wall between the chambers 29, 40, and is provided with a central interior sleeve portion 42 slidably mounting a valve stem 43 having a reduced threaded lower end, upon which the discharge valve disk 33 and a retaining cup 44 are secured by a threaded cap 45. The upper end of the valve stem 43 is in the form of a ball 46.

An angular channel 47 is formed through the stem 43 to provide fluid communication between the ends thereof. The discharge valve disk 33 is urged to closed position by a coil valve spring 48 disposed within the spring housing 37 and pressed downwardly by a base washer 49 held by an adjustable screw bushing 50 threaded into the upper end of the housing 37.

The spring 48 rests upon an outer flange 51 of an inverted cup 52 received within the lower end of the spring 48, said cup embracing and bearing upon the upper ball end 46 of the stem 43 in order to hold the discharge valve disk 33 normally closed.

A flanged bushing 53 surrounds the valve stem 43 in spaced relation, and is threaded through a central aperture of the upper diaphragm 39, and into the lower end of the inverted cup 52, whereby the upper diaphragm 39 is clamped and held sealed against the flange 51.

The upper end of the flanged bushing 53 forms a circular seat 54, whereby communication between the angular channel 47 and the upper chamber 40 may be cut off under certain conditions by contact of said seat 54 with the ball end 46 of the stem 43.

Thus, it will be seen that a continued rise in pressure in the upper chamber 40 will cause the upper diaphragm 39 to flex upwardly against the force of the valve spring 48, first bringing the circular seat 54 into engagement with the upper ball end 46, and closing off communication with the nipple 11. A further rise in pressure will then raise the discharge valve disk 33 from the discharge valve seat 32. The upper chamber 40 is in communication with the vertical channel 13 in the nipple 11 through a conduit 55 in the wall of the housing 10, whereby the fluid pressure will be equalized in the upper chamber 40, the vertical channel 13, and the tank T.

Openings 56 are formed in the spring housing 37 in order to insure that the interior of said housing will remain at atmospheric pressure, thereby permitting free functioning of the upper diaphragm 39 in accordance with the fluid pressures exerted upon it, and providing means for the discharge of fluid, should the diaphragm 39 break. The upper end of the inverted cup 52 is provided with a socket 57 crimped over at its upper edge to retain a lower ball end of a stem 58 extending outwardly through the aperture of the adjustable bushing 50, and pivoted to a manually-operable lever 59, whereby the discharge valve may be opened at any time for purposes of testing.

In order to provide for opening of the relief valve in response to excessive temperature, a heat responsive element 60 is supported concentrically within the vertical channel 13, being adjustably threaded in a lug 61 formed on the lower end of the threaded nipple 11. The upper end of the heat responsive element 60 has a loose pin and socket connection 62 with the lower end of the push rod 28 described previously.

The upper end of the rod 28 within the pressure chamber 29 has an enlarged head 63 engageable with ears 64 formed on the lower edge of the retaining cup 44 of the valve disk 33, whereby expansion of the heat responsive element 60 will open the discharge valve 33 to cause the relief valve to discharge fluid from the tank. When the temperature drops, contraction of the heat-responsive element 60 will permit the spring 48, aided by the internal pressure in the chamber 29, to close the discharge valve 33.

Operation

In operation, the improved relief valve will be connected by means of the threaded nipple 11 to the tank T or other fluid pressure system. The valve mechanism will normally remain in the position shown in the drawing, wherein the main valve disk 14 is closed against the seat 16 to prevent the discharge of fluid.

It will be seen that under these conditions, the fluid will enter the vertical channel 13, the conduit 55, the upper chamber 40, the angular channel 47, and the pressure chamber 29 to press the main diaphragm 19 downwardly to hold the disk 14 closed. The diaphragm 19 being of substantially greater area than said disk 14, any slight increase in pressure will serve to close the main valve more tightly.

Although the pressure in the chamber 40 will tend to raise the flexible upper diaphragm 39, the coiled spring 48 will be adjusted to hold the upper diaphragm 39 depressed under normal conditions of pressure. Inasmuch as the inverted cup 52 is connected to said diaphragm 39, this cup will bear against the upper ball end 46 of the valve stem 43 to hold the discharge valve disk 33 firmly closed, thereby retaining the pressure in the chamber 29. It will be understood that the fluid pressure in the chamber 29 will also tend to hold the disk 33 closed.

Assuming now that the pressure in the tank T rises beyond the release point for which the spring 48 is set, the upper diaphragm 39 will gradually be forced upwardly carrying with it the inverted cup 52.

The discharge valve disk 33 will at first remain against the valve seat 32 due to the pressure acting on top of this disk, so that no pressure drop will occur in the chamber 29. Continued rise in pressure in the chamber 40, however, will bring the circular seat 54, which is supported within the inverted cup 52, into engagement with the ball end 46 of the valve stem.

This movement will result in closing all communication between the chamber 40 and the angular channel 47 in the stem, preventing further pressure rise in the chamber 29. Still further rise of the upper diaphragm 39 will lift the discharge valve 33 from the seat 32, thereby permitting a release of fluid from the chamber 29 through the angular outlet channel 30 and into the discharge pipe P. The resulting pressure drop in the chamber 29 relieves the load from the discharge valve 33, thereby permitting the diaphragm 39 to compress the spring 48 further, in order to lift the discharge valve 33 higher from its seat.

The main diaphragm 19 will then be free to flex upwardly permitting the main valve disk 14 to rise fully under the influence of the fluid pressure in the channel 13 and the tank T, so that the fluid may be discharged from the tank at a high rate.

This discharge will continue until such time as the excess pressure is relieved, whereupon the pressure in the chamber 40 will drop, being equalized with the tank pressure through the conduit 55, until the force of the spring 48 is sufficient to overcome the upward pressure on the upper diaphragm 39.

The inverted cup 52 will then descend, carrying with it the valve stem 43 and the discharge valve 33 to close off the outlet channel 30 from the chamber 29. The parts will now be in their original position, whereby fluid pressure in the tank T and the chamber 29 are equalized to firmly hold the main valve disk 14 against the valve seat 16 at the upper end of the chamber 13, and also to assist the spring 48 in holding the discharge valve disk 33 against the seat 32.

Thus, it will be seen that the main valve is actuated by fluid pressures under the control of an auxiliary spring-pressed discharge valve. The fluid pressure will normally act directly upon the discharge valve 33, tending to hold it closed, and the spring 48, also will act through the inverted cup 52 and the valve stem 43 to maintain a closing force on the discharge valve disk 33. The discharge valve will be opened only when the fluid pressure increases to a point at which the upper diaphragm 39 will be pressed upwardly against the force of the spring 48 and the fluid pressure on the upper side of the disc 33.

Considering now that the fluid pressure drops below a certain predetermined point, the pressure in the chamber 29, being equalized with the tank pressure, will also drop. Since the main diaphragm 19 has a larger effective area than the main valve disk 14, any excessive drop of pressure against the diaphragm will cause the main valve 14 to open due to atmospheric pressure under said diaphragm 19, thereby admitting air from the pipe P through the chamber 15 and the vertical channel 13 to the tank T. Thus, the improved relief valve will serve also as a vacuum breaker.

The improved relief valve also will function to release fluid from the tank T in the event that excessive temperature rise occurs. This function will be a result of the expansion of the heat responsive element 60, thereby raising the push rod 28, the enlarged head 63, and the ears 64 in contact with said enlarged head, in order to open the discharge valve disc 33 and permit discharge of fluid pressure from the pressure chamber 29. When this occurs, the main valve disk 14 will rise from the valve seat 16 to permit fluid to be discharged through the pipe P as described above.

The valve may be readily tested at any time by manually-operating the testing lever 59 to raise the stem 58 and the inverted cup 52 connected therewith, so as to open the discharge valve and thereby permit opening of the main valve 14.

It will be seen that the pressure responsive means and the heat responsive means are independently adjustable. Thus, the screw bushing 50 at the top of the spring housing 37 may be turned to vary the pressure which the spring 48 exerts upon the upper diaphragm 39 to control the point at which the relief valve will operate under the influence of excess pressure. The heat responsive element 60 may be rotated to vary its position in the threaded lug 61, so as to control the point at which the push rod 28 will raise the ears 64 to open the auxiliary discharge valve 33, whereupon the main valve will open in the same manner as when conditions of excess pressure or vacuum occur.

One advantage of the improved relief valve is that failure of the diaphragm or spring will not cause the relief valve to retain fluid under excessive pressures. Failure of the main diaphragm 19 will automatically result in full opening of the main valve disk. Failure of the upper diaphragm 39 will not incapacitate the valve, and will either cause the main valve disk to open or will cause relief of pressure through the ruptured upper diaphragm and the openings 56 in the housing 37.

Thus, the relief valve possesses valuable safety features in the event of accidental breakdown.

Another advantage is that the valve will operate promptly to relieve excess pressure, temperature, or vacuum, while avoiding a so-called snap-action, which is wasteful of fluid, since a considerable drop in pressure must occur before such a valve closes.

Another advantage is that "wire-drawing" will not occur, since movement of the main valve disk, when initiated, will be carried through to completion whereby the valve will be either held open or firmly closed.

Further, the relief valve includes no mechanical leverage or linkage systems, which are difficult to maintain, and yet provides separate adjustments for the point of pressure relief and the point of temperature relief.

While there has been disclosed in this specification one form in which this invention may be embodied, it is to be understood that this form is shown for the purpose of illustration only, and that it is not to be limited to the specific disclosure, but may be modified and embodied in various other forms. In short, the invention includes all the modifications and embodiments coming within the scope of the following claims.

Having thus fully described the invention, what is claimed as new, and for which it is desired to secure Letters Patent, is:

1. In a relief valve having an inlet and an outlet, a main valve controlling communication between said inlet and said outlet, and means including a pressure chamber normally in communication with said inlet for holding said main valve closed; means responsive to a predetermined pressure rise in said inlet for completely closing communication between said pressure chamber and said inlet, means including a normally closed discharge valve for retaining fluid in said pressure chamber, said discharge valve being provided with opposite surfaces respectively exposed to fluid pressures in said pressure chamber and in said outlet and responsive to superior pressure in said pressure chamber for holding said discharge valve closed during said predetermined pressure rise, and means responsive to a further pressure rise in said inlet for opening said discharge valve whereby opening movement of the discharge valve will be uninterrupted by a flow of fluid from said inlet into said pressure chamber.

2. In a relief valve having an inlet, an outlet, a main valve for controlling communication between said inlet and outlet, a pressure chamber, and a movable wall responsive to fluid pressure in said chamber for holding said main valve closed; mechanism comprising a discharge valve and a valve means for providing communication from said pressure chamber with said outlet and with said inlet respectively, a spring means for normally holding said discharge valve closed and said valve means open, and means including a lost motion connection between said movable wall and said discharge valve responsive to successive pressure rises in said inlet for respectively closing said valve means completely and opening said discharge valve, whereby fluid from said inlet will be prevented from entering said pressure chamber during opening movement of said discharge valve.

3. In a relief valve having an inlet, an outlet, and a pressure chamber; mechanism for controlling fluid pressure in said chamber, comprising a valve means for admitting fluid from said inlet to said pressure chamber, a spring-pressed movable wall exposed to the pressure of fluid in said inlet, said movable wall being connected to said valve means and being movable in response to a predetermined rise in said inlet fluid pressure to completely close said valve means, a discharge valve for releasing fluid from said pressure chamber, and a lost-motion connection between said movable wall and said discharge valve responsive to a further rise in said inlet pressure for initiating and continuing opening movement of said discharge valve.

4. In a relief valve having a pressure chamber, mechanism for controlling fluid pressure in said chamber comprising an outlet channel having a valve seat within said chamber, a discharge valve member adapted to engage said valve seat, an upper chamber communicating with a source of fluid under pressure and having a wall movable in response to changes in fluid pressure, a lost-motion connection between said movable wall and said discharge valve member comprising a valve means and a slidable hollow stem connected thereto, said stem extending into both of said chambers and providing an inlet channel for said pressure chamber, said valve means controlling said inlet channel and comprising an enlarged valve element on said stem and a circular seat loosely embracing said stem inwardly of said valve element so as to engage said valve element and close said inlet channel upon extension of said lost-motion connection, and resilient means for holding said valve means open and said valve member closed, whereby a pressure increase in said upper chamber will first close said valve means, and a further pressure increase will separate said discharge member from its seat.

5. In a relief valve, a housing having a circular main valve seat internally thereof, and a passage through said seat and housing adapted to be connected in communication with a pressure system below said seat, a main valve disk movable downwardly against said seat, a diaphragm of greater area than said valve disk, a valve stem securing said disk to said diaphragm whereby fluid pressure upon the upper side of said diaphragm is adapted to press said disk against said valve seat, means normally equalizing the fluid pressure on the upper side of said diaphragm with the pressure in the pressure system, means automatically relieving said diaphragm of fluid pressure in response to a predetermined pressure rise, a heat-expansive element, means for adjustably mounting said element within said passage below said main valve disk, and mechanism providing operative engagement between said heat-expansive element and said pressure relieving means, whereby expansion of said element in response to an increase in temperature in said passage to a predetermined point will actuate the pressure relieving means to relieve the fluid pressure upon the diaphragm, and permit the main valve to open.

6. The invention as defined in claim 5, in which said mechanism includes a push rod extending from said element through a bore in said valve stem and upwardly beyond said diaphragm, said push rod being operatively engaged with said pressure relieving means.

ERICH W. WORK.

REFERENCES CITED

The following references are of record in the file of this patent:

UNITED STATES PATENTS

| Number | Name | Date |
|---|---|---|
| 853,785 | Henry | May 14, 1907 |
| 868,030 | Tanner | Oct. 15, 1907 |
| 919,300 | Anderson | Apr. 27, 1909 |
| 1,021,505 | Coggin et al. | Mar. 26, 1912 |
| 1,056,562 | Lombard | Mar. 18, 1913 |
| 1,941,023 | Smith | Dec. 26, 1933 |
| 2,214,963 | Jurs | Sept. 17, 1940 |
| 2,283,513 | Smith | May 19, 1942 |
| 2,389,437 | Kmiecik | Nov. 20, 1945 |
| 2,420,206 | Smith | May 6, 1947 |
| 2,461,982 | Horne | Feb. 15, 1949 |